US00RE36227E

United States Patent [19]

Arnoux

[11] E Patent Number: Re. 36,227

[45] Reissued Date of Patent: Jun. 15, 1999

[54] DIGITAL CURRENT PROBE AND GROUND TESTER

[75] Inventor: Daniel Arnoux, Paris, France

[73] Assignee: Societe Chauvin Arnoux, Paris, France

[21] Appl. No.: 29/077,688

[22] Filed: Sep. 26, 1997

Related U.S. Patent Documents

Reissue of:

[64] Patent No.: Des. 362,639
Issued: Sep. 26, 1995
Appl. No.: 29/017,865
Filed: Jan. 24, 1994

[51] LOC (6) Cl. ..... 10-04

[52] U.S. Cl. ..... D10/79

[58] Field of Search ..... D10/78, 79; 324/508, 324/510; 340/649

[56] References Cited

U.S. PATENT DOCUMENTS

D. 332,574 1/1993 Chang ..... D10/79 X
D. 345,704 4/1994 Shirai ..... D10/79
4,283,677 8/1981 Niwa ..... D10/79 X

*Primary Examiner*—Antoine Duval Davis
*Attorney, Agent, or Firm*—John L. Welch, Esq.

[57] CLAIM

The ornamental design for a digital current probe *and ground tester*, as shown and described.

DESCRIPTION

FIG. 1 is a front perspective view of the digital current probe *and ground tester* of this invention;
FIG. 2 is a front plan view of FIG. 1;
FIG. 3 is a plan view of the rear of FIG. 1;
FIG. 4 is a plan view of FIG. 1 as seen from the right side of FIG. 2;
FIG. 5 is a view of the left side of FIG. 2;
FIG. 6 is a top plan view of FIG 2; and,
FIG. 7 is a bottom plan view of FIG 2.

1 Claim, 5 Drawing Sheets

Figure 1:
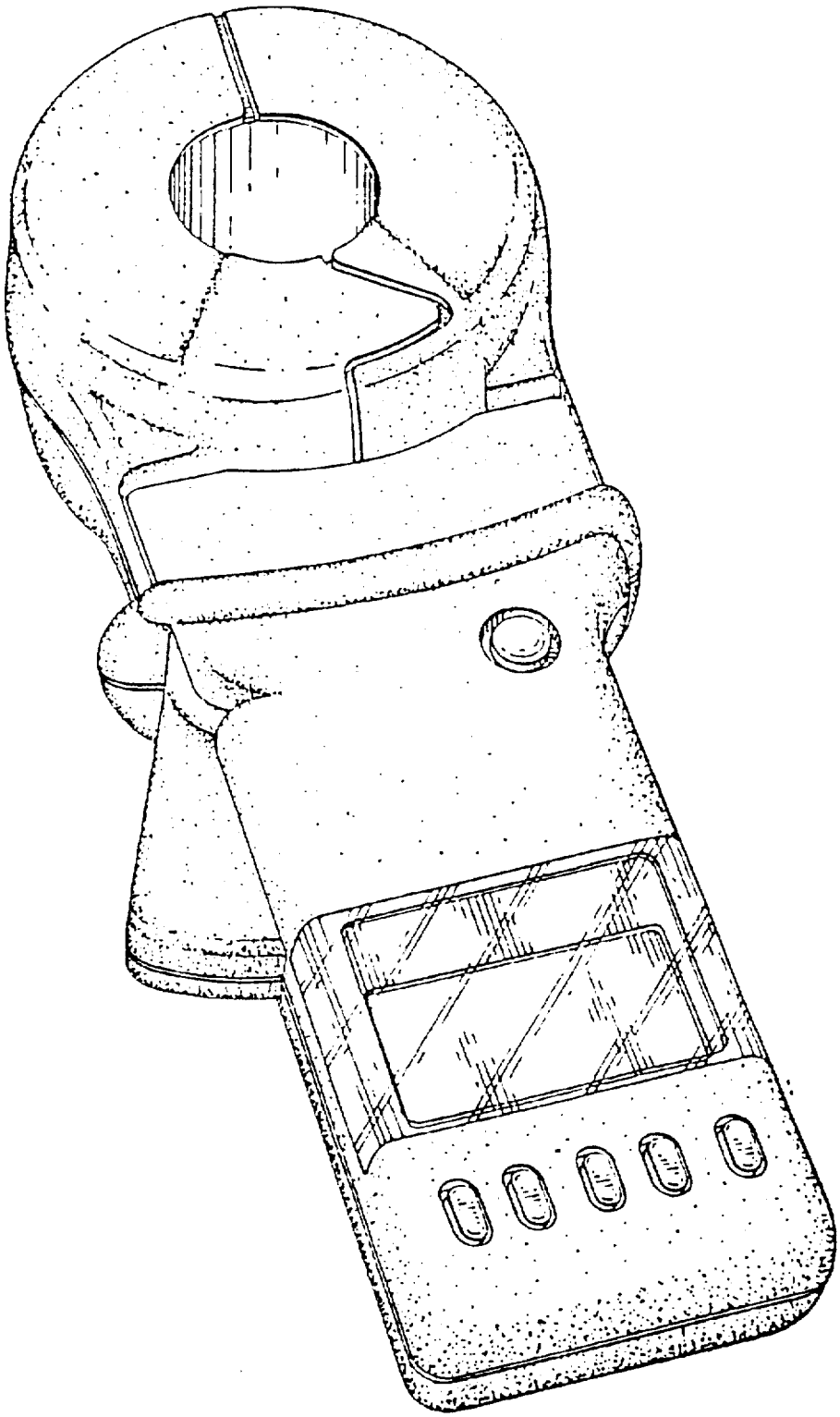
Figure 2:
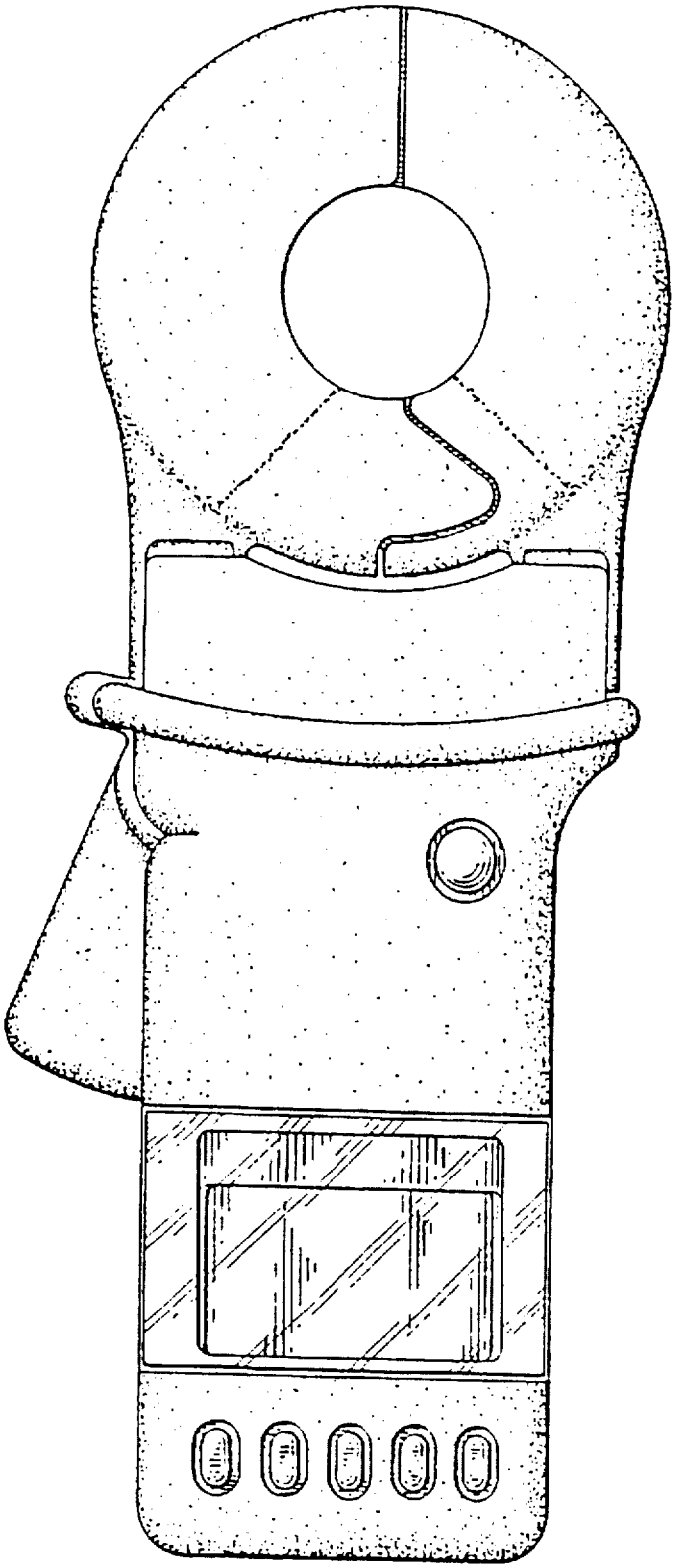
Figure 3:
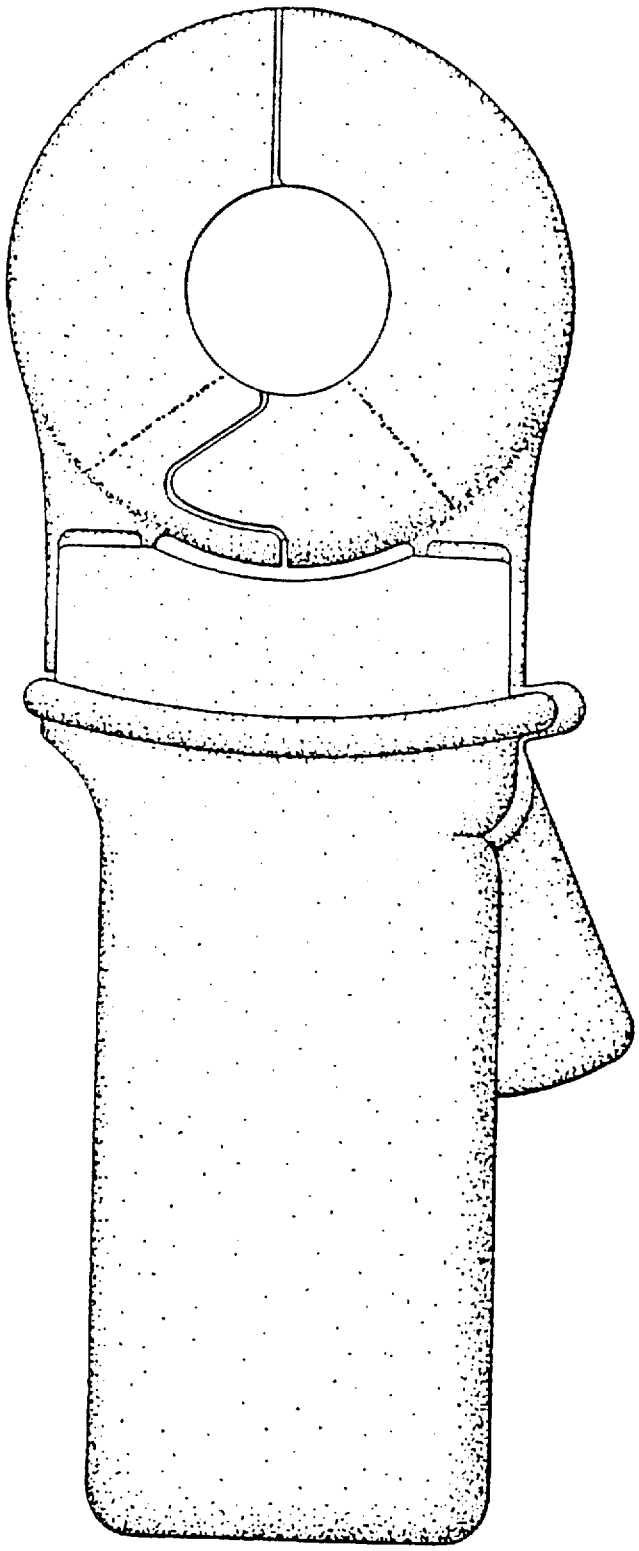
Figure 4:
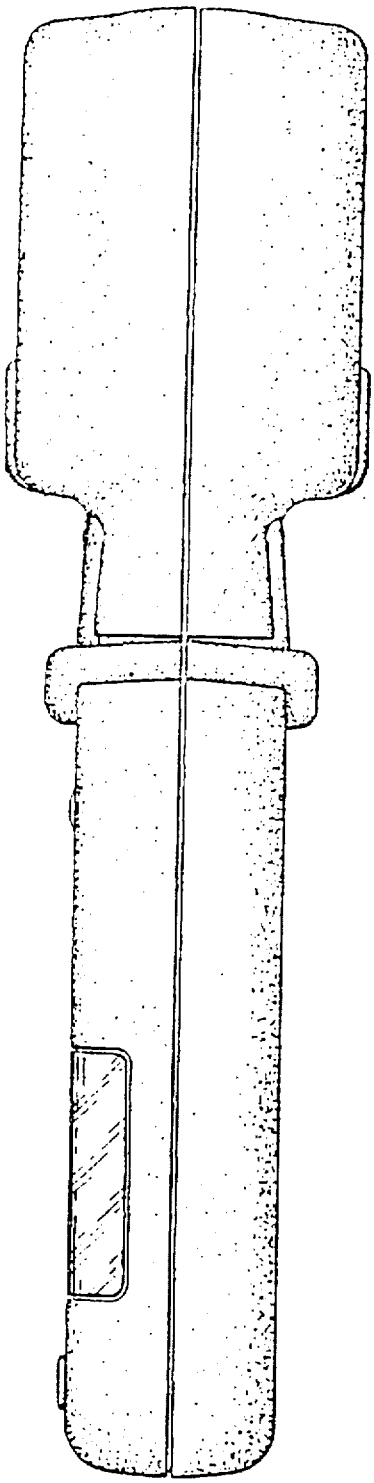
Figure 5:
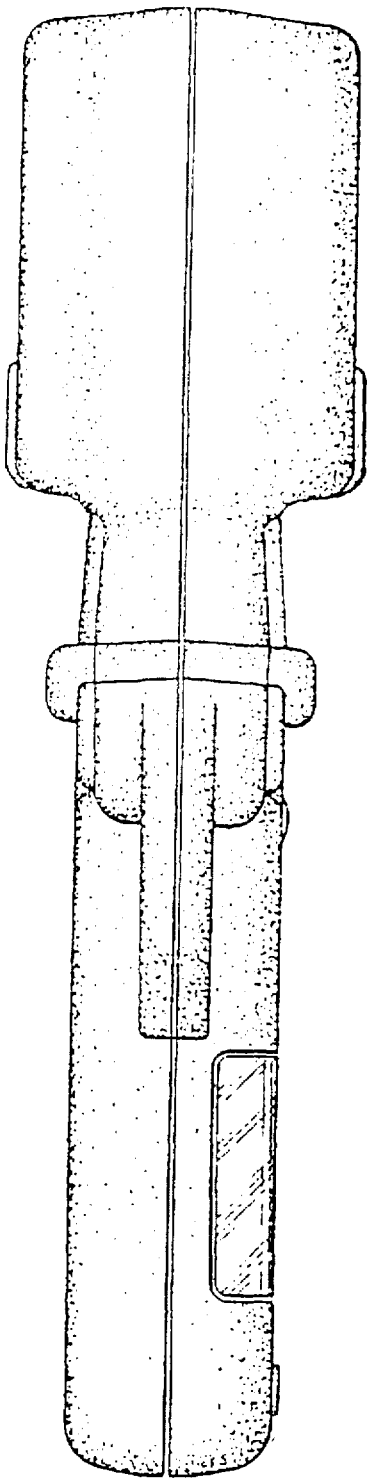
Figure 6:
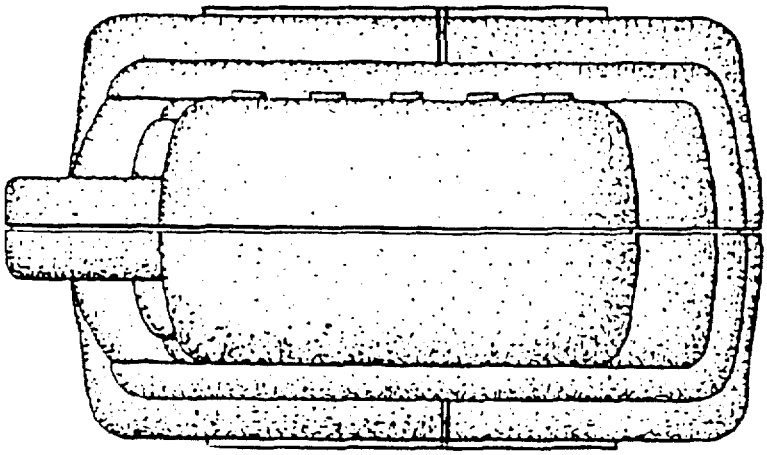
Figure 7:
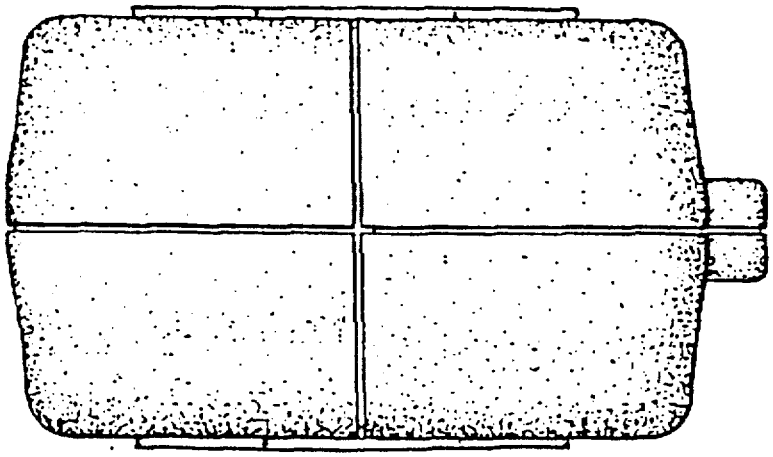

Matter enclosed in heavy brackets [ ] appears in the original patent, but forms no part of this reissue; matter printed in italics indicates the additions made by reissue.